May 8, 1945.  J. T. GONDEK ET AL  2,375,410
RELIEF VALVE
Filed April 25, 1942
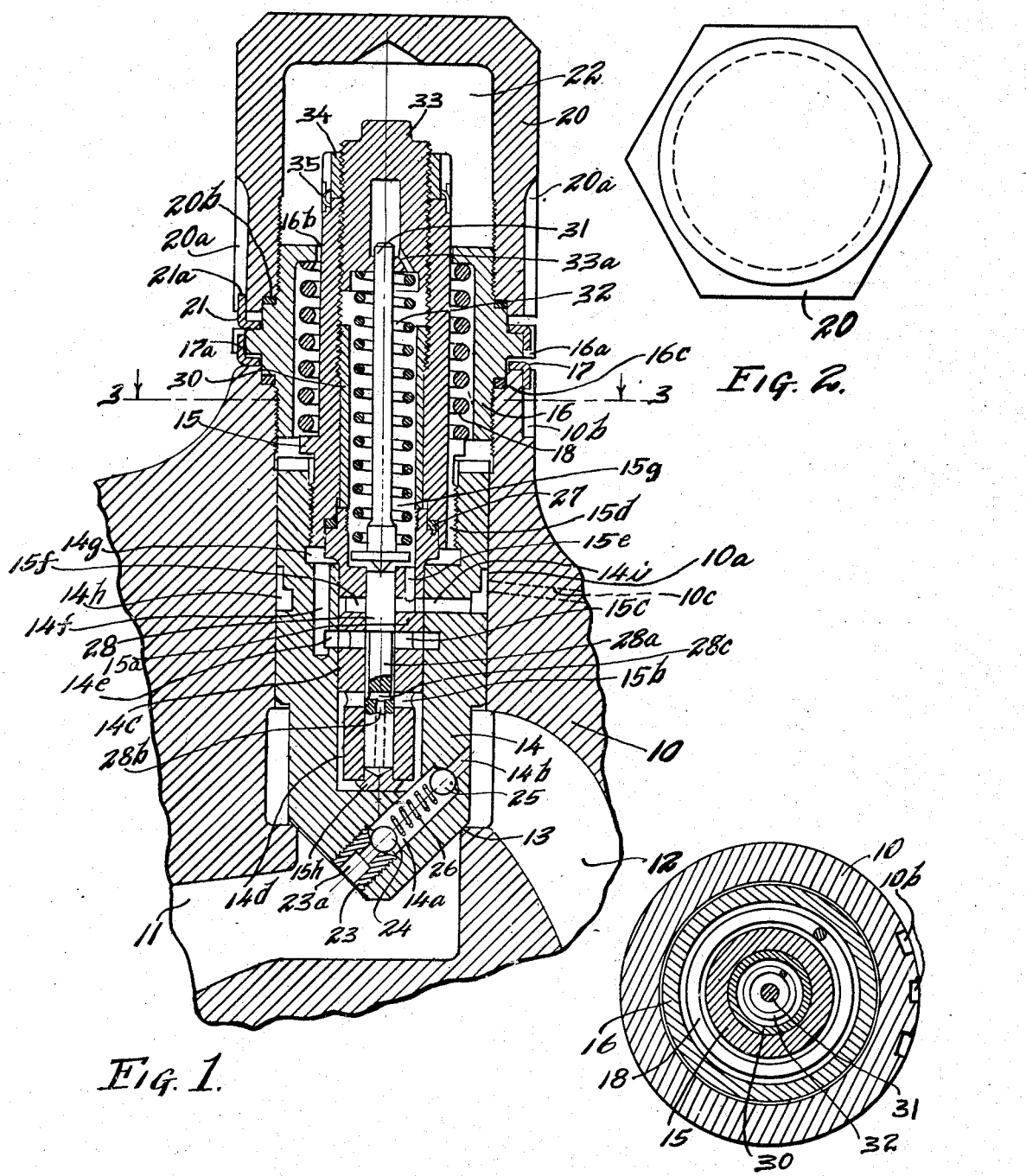
INVENTORS
JOHN T. GONDEK
RICHARD C. WILSON
By Chas. C. Reif
ATTORNEY Patented May 8, 1945

2,375,410

UNITED STATES PATENT OFFICE 2,375,410

RELIEF VALVE

John T. Gondek and Richard C. Wilson, Minneapolis, Minn., assignors to Northern Pump Company, Minneapolis, Minn., a corporation of Minnesota Application April 25, 1942, Serial No. 440,534

10 Claims. (Cl. 137—53)

This invention relates to a valve or relief valve, and particularly to a relief valve of the pilot type.

Relief valves are used where liquid or fluid is moved or stored under pressure and when the pressures are rather high a problem arises in having a valve which will open at a certain pressure and close at a desired lower pressure and a valve which will act positively and with little noise or chattering. A simple spring-pressed relief valve cannot successfully be used at pressures much above 500 pounds. If the spring holding valve closed is set to open at 500 pounds and the pressure builds up to that point, the valve will open at said setting. However, as the volume of liquid being handled by the valve increases the relief or exhaust pressure also increases. As the volume decreases the pressure will decrease to a lower value than that at which the valve opens, thus ending with a much lower value than the original setting of the valve. To overcome this condition an extremely large spring must be used which makes the valve cumbersome where conditions of space and weight are limited. Such valves are also quite noisy and operate with a great deal of chattering and vibration.

It is an object of this invention to provide a relief valve which is of the pilot type or pilot operated and constructed and arranged to utilize the pressure being relieved in such a way as to replace the action of the spring used in the spring loaded relief valve.

It is a further object of the invention to provide a relief valve structure comprising a main valve adapted to shut off communication between the pressure line and the relief line, said main valve having a chamber thereabove, a passage leading from the pressure line to said chamber together with a spring pressed pilot valve acting to control said passage so that the pressure in said chamber cannot exceed a predetermined maximum.

It is also an object of the invention to provide a relief valve comprising a main valve closing the pressure line, said main valve having a chamber thereabove, a passage leading from the pressure line to this chamber together with a pilot valve adapted to be moved by pressure in said chamber and having means to close or restrict said passage when so moved.

It is another object of the invention to provide a relief valve of the pilot operated type comprising a main valve shutting off communication between the pressure line and the relief line so as to be acted upon by the fluid in the pressure line, said valve having a chamber thereabove, a passage leading from the pressure line to said chamber, a pilot valve adapted to be acted upon by pressure of fluid in said chamber, resilient means for placing different pressures on said pilot valve, said pilot valve having means for restricting or closing said passage when moved by pressure of fluid in said chamber.

It is still another object of the invention to provide such a valve as set forth in the preceding paragraph in which said pilot valve is disposed within said main valve and a spring disposed in a chamber is used to place pressure upon said pilot valve, said spring being arranged to be adjusted at different pressures by a threaded plug extending into said chamber above said main valve together with means for relieving any fluid which might leak into said spring chamber.

It is more specifically an object of the invention to provide a pilot operated relief valve comprising a main valve shutting off communication between the pressure and relief lines and acted upon by pressure of fluid in the pressure line, a chamber above said main valve, a pilot valve disposed in said main valve, a passage extending from said pressure line through said main valve to said chamber, a spring acting on said main valve and tending to hold it in closed position, said pilot valve being constructed and arranged to be moved by pressure of fluid in said chamber and having means when so moved to restrict or close said passage, a spring for determining the pressure at which said pilot valve can be moved and means for varying the position of said spring.

These and other objects and advantages of the invention will be fully set forth in the following description made in connection with the accompanying drawing in which like reference characters refer to similar parts throughout the several views and in which:

Fig. 1 is a central vertical section through said valve and a portion of the member in which it is disposed;

Fig. 2 is a top plan view of said valve; and

Fig. 3 is a transverse section taken on line 3—3 of Fig. 1 as indicated by the arrows.

Referring to the drawing a portion of a member 10 is shown which could represent any member in which the valve could be carried and which would have therein a pressure line or conduit 11 and a relief or release line or conduit 12. In the embodiment of the invention illustrated member 10 represents a part of a liquid pump having therein the conduit 11 containing the liquid or fluid under pressure and the conduit 12 which is the relief conduit and in which the liquid is under low pressure. Conduit 11 has formed thereabout a valve seat 13 and this is engaged by a main valve 14 which thus closes or shuts off communication between conduits 11 and 12. Valve 14 is movable upwardly in a bore 10a in member 10 and is bored and threaded at its upper end to receive the lower end of a casing or sleeve 15. A member 16 is threaded into a bore in the upper end of member 10, the same having a cylindrical portion provided with circumferentially spaced notches 16a, any one of which is adapted to receive the upturned portion 17a of a locking disk or washer 17. Member 10 is provided with one or more notches 10b on its periphery on which the downturned portion of member 17 may be disposed. Member 16 can thus be adjusted and held securely in its adjusted position against a gasket 16c. Member 16 is bored and has disposed therein a compression coiled spring 18, one end of which engages the top of the bore in member 16 and the lower end of which engages a shoulder on member 15. Spring 18 thus exerts pressure downwardly on member 15 and thus on the main valve 14, tending to hold the latter on its seat. A hollow cap 20 is internally threaded to be screwed on the top of member 16. Cap 20 at the lower part of its periphery is provided with circumferentially spaced notches 20a any one of which is adapted to receive the upturned portion 21a of a locking member or washer 21, a downturned portion of which may be received in any one of the notches 16a. Cap 20 can thus be held securely in any position to which it is adjusted on member 16 as shown in Fig. 1, the upper portion of member 20 being hexagonal as shown in Fig. 2. A gasket 20b on member 16 is engaged by member 20. A chamber 22 is thus formed above main valve 14 and specifically above member 16. It will be noted that member 16 has an opening 16b at its top somewhat greater in diameter than the diameter of member 15 which passes therethrough so that chamber 22 is in communication with the chamber in member 16 in which spring 18 is disposed and is thus in communication with the space or chamber in member 10 directly above valve 14 so that the pressure in chamber 22 acts upon the entire upper surface of valve 14 or the parts connected thereto. Valve 14 at its lower end is provided with a bore 14a in one end of which is threaded a plug 23. Passage 23a in plug 23 extends from conduit 11 into bore 14a and bore 14a has a smaller passage 14b leading therefrom into the conduit 12. Bore 14a is formed at one end with a frusto-conical valve seat extending about passage 14b and plug 23 is formed at its inner end with a similar valve seat extending about passage 23a. Ball valves 24 and 25 are disposed in bore 14a adapted to engage the valve seats at the ends thereof respectively and a compression coiled spring 26 engages said valves tending to hold them on their respective seats. Main valve 14 is provided with a central bore 14c in which is received the lower portion 15a of member 15. While member 15 is considered as one member, it is illustrated as made in two parts tightly fitted and between which is disposed a gasket 27. Portion 15a is reduced at its lower end so that an annular chamber 14d is formed thereabout. Portion 15a is centrally bored and has disposed therein a pilot valve 28. Portion 15a is also provided with a transverse bore 15b which thus communicates with the bore in which valve 28 is disposed. Member 15a is provided with another transverse bore 15c some distance above bore 15b and this aligns with an annular groove 14e in main valve 14. A vertical bore or passage 14f is formed in main valve 14 extending from the annular groove 14e upward to another annular groove 14g. Main valve 14 has an annular groove 14h in its periphery and said valve also has a transverse bore 14i extending from groove 14h inwardly to its central bore, the same being shown as aligned with the transverse bore 15f in portion 15a. A passage 10c extends from the bore in which valve 14 moves to the supply tank for liquid and this bore 10c is located to communicate with the annular groove 14h. Member 15 is provided with a vertical slot 15d at one side which communicates at its lower end with annular groove 14g and extends to the space between valve 14 and member 16. Portion 15a of member 15 is also provided with a vertical bore or passage 15e which extends from another transverse bore 15f disposed some distance above transverse bore 15c to a central bore 15g extending into the upper end of member 15 and with which the bore receiving valve 28 communicates. Valve 28 has upper and lower cylindrical portions fitting the central bore in portion 15a and has a central portion 28a of reduced diameter. Portion 15a has at its lower end a plug-like portion 15h closing the lower end of the central bore therein, the same being shown as engaging the bottom of the bore in main valve 14. Plug portion 15h has an inverted conical depression in its upper end. Pilot valve 28 has a central bore 28b extending from its lower end to aproximately the top of its lower cylindrical portion and this bore communicates with a transverse bore 28c extending through valve.

A shell or sleeve 30 is disposed in the central bore in the upper portion of member 15, the same being threaded in said bore at its upper end, the lower end of said sleeve engaging the top of the lower portion 15a. A plunger 31 is disposed in member 30 and the bore in member 15, the same having a collar at its lower end from which projects a pointed conical projection which centrally engages the upper end of pilot valve 28. A compression coiled spring 32 surrounds plunger 31, the same bearing at its lower end against said collar on said plunger and at its upper end against the lower end of a plug 33 threaded into the upper end of member 15. Said plug has a recess in its lower end receiving the upper end of spring 32. A lock nut 34 is threaded on plug 33, the same engaging the upper end of member 15. Member 15 and nut 34 have circumferentially spaced grooves adapted to receive a locking member 35 acting to hold nut 34 in position. Plug 33 has a central recess and is bored at its lower end to receive the upper end of plunger 31. A drain passage 33a extends from said central recess to the bottom of plug 33.

In operation the valve will be constructed and disposed as shown and the fluid or liquid under high pressure will be contained in conduit 11. Let it be assumed that the portion of main valve 14 exposed to the high pressure liquid has half the area of the upper end of said valve. A pressure of 500 pounds per square inch in chamber 22 would then balance a pressure of 1000 pounds per square inch in conduit 11. Such a ratio of areas is not of course, in all constructions essential. Assuming then, that the valve is set to open at 1000 pounds per square inch. It will be desired to prevent the pressure per square inch on top of the valve or in chamber 22 from rising above 500 pounds. It will be seen that the high pressure fluid or liquid will displace ball valve 24 and will pass into the chamber 14d about portion 15a. The fluid or liquid will then enter transverse bore 15b and the transverse bore 28c and pass about the reduced portion 28a of pilot valve 28 to transverse bore 15c and the annular groove 14e. The liquid can then pass upward through passage 14f to annular groove 14g and thence through slot 15d to the upper end of valve 14 and into the space between member 16 and valve 14. The liquid then will pass into the bore of member 16 and through opening 16b to chamber 22. The spring 32 will be set under the desired tension to prevent the pressure above valve 14 or in chamber 22 from rising above the desired value. Should the pressure in chamber 22 increase to over the desired 500 pounds per square inch, pilot valve 28 will be lifted by the fluid or liquid acting on the bottom thereof through bore 28b and said valve will move up against the pressure of spring 32 so that its lower cylindrical portion will close off the transverse bore 15b. Should the liquid or oil under pressure bleed or leak past the place where pilot 28 has cut off the communication with chamber 22 so that the pressure would again increase in said chamber, this would result as stated, in lifting the pilot and further increasing the restriction. The communication between high pressure conduit 11 and chamber 22 will thus be cut off or restricted and the pressure above valve 14 will be held at the desired point. As the pressure increases in conduit 11 from zero to 1000 pounds per square inch, the pressure above the valve is thus held from rising above 500 pounds per square inch. If the pressure in conduit 11 increases to a point beyond 1000 pounds per square inch valve 14 will be lifted and the pressure will be relieved into conduit 12.

In considering the condition of oil leaking past the pilot valve another condition of leakage is noteworthy. At all times there is a slight amount of oil or liquid leaking between the outer periphery of the main valve 14 and the wall of bore 10a into groove 14h. Some liquid or oil will also leak past the pilot valve from passage 15c to passage 15f and to annular groove 14h. Any oil leaking past the main valve 14 will reach groove 14h and all liquid or oil reaching this groove will be vented back into the supply tank which of course, will be at zero pressure. The leakage of oil assists in the operation of the valve. It will be noted that when the valve 14 lifts at a pressure above 1000 pounds per square inch the oil above said valve is apparently trapped. However, this oil can leak past said valve and be vented as described and thus really act as a dash pot to cushion the main valve 14 against any tendency to chatter or flutter. The spring 18 acting on the upper side of valve 14 has no specific function in the operation of valve 14 in relieving the pressure. Said spring is provided for the purpose of holding the main valve seated when the hydraulic system is idle. Without this spring the fluid which is usually oil, would bypass through valve 14 when the hydraulic circuit was first put into operation. Valve 14 must be held securely to its seat at the beginning of the operation in order to enable pressure to build up on top of the main valve.

Frequently it is desirable in the case of hydraulic transmissions to use two relief valves both operating at the same pressure and capacity. This is true where two variable displacement pumps or units are piped together, one unit being used as a hydraulic pump with controls for reversing the stroke or output and the other unit being used as a hydraulic motor. With two pumps or units so hooked up the rotation of the output shaft can be reversed at will by reversing the stroke of the hydraulic pump which in turn reverses the flow of oil through the pipe lines connecting the two units. If there is a possibility of the transmission output shaft stalling in service depending on the operation it may be desirable to provide a relief valve in each pipe line to prevent overloading the system. Each of such valves would be arranged to dump or release into the opposite line. With the use of the double ball check valves shown as 24 and 25 in Fig. 1, it is possible to use only one relief valve in place of the two separate relief valves. The valve described could thus be connected across the two lines which run between the pump and the motor. When conduit 11 is used as the high pressure conduit the description shows that the pressure is directed past the lower ball valve 24, which is acted upon by springs, into bore 14a and thence to chamber 14d. Should the system be reversed so that conduit 12 becomes the high pressure conduit, the oil or liquid would enter passage 14b moving ball 25 from its seat and would enter chamber 14d. The valve as shown could thus be used connected between the two pipe lines as suggested and only one relief valve would be necessary. When the valve is so used as a single relief valve between the two pipe lines connecting a hydraulic pump and motor the area of main valve 14 exposed to conduit 11 must be the same as the area exposed to conduit 12 if the oil or liquid is to be relieved at the same pressure from both directions.

From the above description it will be seen that we have provided a simple, compact and efficient structure of relief valve. The valve can be used with high pressures and will function quietly and efficiently at pressures as high or higher than 4000 pounds per square inch. Hydraulic circuits operating at pressures higher than 4000 pounds per square inch are seldom, if ever used. The valve can function efficiently on pressures about as low as 100 pounds per square inch. Below 100 pounds per square inch the simple spring loaded ball type of valve can be satisfactorily operated. The valve operates accurately and quietly, the same not having the objection of chattering or being noisy. The valve will also operate accurately and efficiently regardless of the volume of liquid or oil being relieved, within the designed capacity of the valve. The valve has been amply demonstrated in actual practice and is being commercially made.

It will, of course, be understood that various changes may be made in the form, details, arrangement and proportions of the parts, without departing from the scope of applicants' invention, which generally stated, consists in a device capable of carrying out the objects above set forth, in the parts and combinations of parts disclosed and defined in the appended claims.

What is claimed is:

1. A relief valve having in combination, a conduit adapted to contain liquid at high pressure, a second conduit adapted to be placed in communication with said first mentioned conduit and adapted to contain liquid at low pressure, a main valve closing communication between said conduits, said main valve having a bore therein, a member disposed in said bore, said member having a central bore therein, a pilot valve fitting in and movable in said central bore, means forming a chamber above said main valve and member, said member being reduced at its lower end to form a chamber thereabout, a passage leading from said first mentioned conduit to said last mentioned chamber, said member having a transverse bore therein at the top of said last mentioned chamber, said pilot valve having a reduced central portion forming an annular chamber in said central bore communicating with said transverse bore, a passage connecting said annular chamber with said first mentioned chamber, a passage leading from said annular chamber to the bottom of said pilot valve, the lower portion of said pilot valve being constructed and arranged upon movement thereof to restrict or shut off said transverse bore and thus shut off communication between said first mentioned conduit and first mentioned chamber in the movement of said pilot valve.

2. The structure set forth in claim 1, said last mentioned passage comprising a transverse bore communicating with said first mentioned transverse bore, and a second bore extending longitudinally of said pilot valve from said second mentioned transverse bore to the lower end of said pilot valve.

3. A relief valve having in combination, a conduit adapted to have fluid under high pressure therein, a valve seat about said conduit, a conduit communicating with said seat adapted to receive fluid under low pressure, a main valve engaging said seat and shutting off communication between said conduits, a closed chamber above said main valve, a second chamber in said main valve communicating at one end with said first mentioned conduit and at its other end with said second mentioned conduit and having oppositely facing valve seats at its ends, spring-pressed valves engaging said seats respectively, a passage leading from said second chamber to said first mentioned chamber, a pilot valve adapted to be moved by pressure of fluid in said closed chamber and constructed and arranged upon such movement to restrict or close said passage when so moved and yielding means for holding said pilot valve in open position until a predetermined pressure is reached in said closed chamber.

4. A relief valve having in combination, a conduit adapted to have fluid under high pressure therein, a valve seat about said conduit, a conduit in communication with said valve seat adapted to receive fluid under low pressure, a main valve engaging said seat and shutting off communication between said conduits, a casing having an opening in which said main valve fits and is movable, said casing having a closed chamber therein above said main valve, said main valve having a bore therein, a plunger fitting in and movable in said bore constituting a pilot valve and carried by said main valve, a passage leading from said conduits through said main valve and to said chamber and constituting the sole connection between said chamber and said conduits, said passage including a portion extending transversely through said plunger, a plug threaded into the upper end of said main valve having a second chamber therein, a cap threaded into the upper end of said plug, a rod in said second chamber engaging said plunger at its lower end, a spring in said second chamber acting on said rod and engaging said cap, holding said plunger in normal position and being adapted to yield and permit movement of said plunger upon the attainment of a certain predetermined pressure in said first mentioned chamber, said plunger having means when raised to restrict and close said transverse portion of said passage to maintain said pressure in said first mentioned chamber for urging said main valve closed, said main valve remaining closed until a certain increase in pressure in said first mentioned conduit overcomes the pressure in said chamber.

5. A relief valve having in combination, a conduit adapted to have fluid under high pressure therein, a valve seat about said conduit, a conduit in communication with said valve seat adapted to receive fluid under low pressure, a main valve engaging said seat and shutting off communication between said conduits, a casing having an opening in which said valve fits and is movable, said casing having a closed chamber therein above said main valve, said main valve having a bore therein, a pilot plunger valve supported in said main valve, fitting in and movable in said bore, a member fixedly mounted in said main valve, yielding means acting on said member and pilot plunger valve to hold the latter in normal position until the attainment of a certain pressure in said closed chamber, a passage from said first mentioned conduit to said closed chamber and constituting the sole communication between either of said conduits and said chamber, said pilot plunger valve being constructed and arranged to lift upon attainment of a certain pressure in said chamber and to close said passage to maintain said pressure in said chamber for urging said main valve to closed position, said main valve remaining closed after lifting of said pilot plunger until said pressure in said closed chamber is overcome by pressure in said first mentioned conduit and then lifting to permit passage of fluid to said low pressure conduit.

6. The structure set forth in claim 5, said main valve having an annular groove about its periphery, said periphery fitting the wall of said chamber above said groove so that liquid can leak past the same, said chamber being closed so that the fluid above said valve must leak past said periphery to said groove when said main valve lifts, said fluid acting as a dash pot.

7. The structure set forth in claim 5, said main valve having a portion closely fitting the wall of said casing and having an annular groove in its periphery above said portion and a vent passage in said casing leading from said groove whereby fluid leaking upward past said portion will reach said groove and be vented.

8. A relief valve having in combination, a conduit adapted to have fluid under high pressure therein, a valve seat about said conduit, a conduit in communication with said valve seat adapted to receive fluid under low pressure, a main valve engaging said seat and shutting off communication between said conduits, a closed chamber above said main valve, a passage leading from said first mentioned conduit to said chamber and constituting the sole communication between either of said conduits and said chamber, a pilot valve adapted to be moved by a certain pressure of fluid in said chamber and constructed and arranged to close said passage when a certain pressure is attained in said chamber to maintain said certain pressure in said chamber for urging said main valve to closed position and yielding means for urging said pilot valve to open position but permitting its closure upon the attainment of said certain pressure, said main valve remaining closed after said passage is closed until the attainment of a certain pressure in said first mentioned conduit overcomes said certain pressure in said chamber.

9. A relief valve having in combination, a conduit adapted to have fluid under high pressure therein, a valve seat about said conduit, a conduit in communication with said valve seat adapted to receive fluid under low pressure, a main valve engaging said seat and shutting off communication between said conduits, a closed chamber above said main valve, a passage leading from said first mentioned conduit to said chamber and constituting the sole connection between either of said conduits and said chamber, a pilot valve controlling the flow of fluid to said chamber through said passage, a spring urging said pilot valve to open position, said spring yielding upon the attainment of a certain predetermined pressure in said chamber to permit movement of said pilot valve, said pilot valve being constructed and arranged to close said passage to maintain said predetermined pressure in said chamber for urging said main valve to closed position, said main valve opening subsequently upon the attainment of sufficient pressure in said first mentioned conduit to overcome said predetermined pressure in said chamber.

10. A relief valve having in combination, a conduit adapted to have fluid under high or low pressure therein, a valve seat about said conduit, a second conduit in communication with said valve seat adapted to receive fluid under high or low pressure, a main valve engaging said seat and shutting off communication between said conduits, a closed chamber above said main valve, a passage connecting both of said conduits with said chamber, means in said passage acting to close said passage to the conduit containing fluid under low pressure, said passage constituting the sole connection between said chamber and either of said conduits, a pilot valve closing said passage and constructed and arranged to be moved by a certain predetermined pressure of fluid in said chamber, said pilot valve closing said passage upon said movement to maintain said predetermined pressure in said chamber for urging said main valve to closed position, said main valve remaining closed after closure of said passage by said pilot valve until the pressure in said conduit having fluid under high pressure therein overcomes said predetermined pressure in said chamber.

RICHARD C. WILSON.
JOHN T. GONDEK.